US006741453B1

(12) United States Patent
Aleardi et al.

(10) Patent No.: US 6,741,453 B1
(45) Date of Patent: May 25, 2004

(54) BOARD-MOUNTED ELECTRONIC DEVICE, IN PARTICULAR AN ELECTRONIC GAS LIGHTER, INCLUDING MEANS FOR FAST CONNECTION OF INSULATED ELECTRIC WIRES TO AN ELECTRIC CIRCUIT ON THE BOARD

(75) Inventors: Massimo Aleardi, Cassano Magnago (IT); Raoul Bianchi, Villa Guardia (IT)

(73) Assignee: ITW Industrial Components S.R.L., Milan (IT)

( * ) Notice: Subject to any disclaimer, the term of this patent is extended or adjusted under 35 U.S.C. 154(b) by 0 days.

(21) Appl. No.: 09/744,692

(22) PCT Filed: Jul. 28, 1999

(86) PCT No.: PCT/IT99/00248

§ 371 (c)(1), (2), (4) Date: Jun. 12, 2001

(87) PCT Pub. No.: WO00/07263

PCT Pub. Date: Feb. 10, 2000

(30) Foreign Application Priority Data

Jul. 28, 1998 (IT) .................................... TO980144 U

(51) Int. Cl.[7] ............................................ H02B 1/20

(52) U.S. Cl. .................................... 361/640; 439/404

(58) Field of Search .......................... 439/83, 395, 404, 439/876; 361/640, 719; 702/76, 48, 54, 145, 146, 151

(56) References Cited

U.S. PATENT DOCUMENTS

| | | | | | |
|---|---|---|---|---|---|
| 4,261,629 | A | * | 4/1981 | Reynolds et al. | 439/82 |
| 4,391,484 | A | * | 7/1983 | Foederer | 439/404 |
| 5,091,826 | A | * | 2/1992 | Arnett et al. | 361/776 |
| 5,127,153 | A | * | 7/1992 | Mitra | 29/753 |
| 5,357,074 | A | * | 10/1994 | Pawlikowski | 219/85.18 |
| 5,494,456 | A | | 2/1996 | Capilupo et al. | |
| 5,975,919 | A | * | 11/1999 | Arnett et al. | 439/82 |
| 6,146,185 | A | * | 11/2000 | Cole et al. | 439/399 |
| 6,151,221 | A | * | 11/2000 | Van Lerberghe | 361/774 |
| 6,206,719 | B1 | * | 3/2001 | Tsunezawa et al. | 439/395 |
| 6,264,510 | B1 | * | 7/2001 | Onizuka et al. | 439/876 |

FOREIGN PATENT DOCUMENTS

| | | |
|---|---|---|
| EP | 0 177 955 A | 4/1986 |
| EP | 0 452 061 A | 10/1991 |
| EP | 0 727 851 A | 8/1996 |
| EP | 0 829 924 A | 3/1998 |

* cited by examiner

*Primary Examiner*—Lynn Feild
*Assistant Examiner*—Thanh-Tam Le
(74) *Attorney, Agent, or Firm*—Lowe Hauptman Gilman & Berner LLP

(57) ABSTRACT

A device including: a board for supporting electronic components and supporting an electric circuit for mutual connection of the electronic components; and at least one terminal for electrically connecting the circuit and a respective insulated electric wire having an inner conductor covered with a coated and/or applied insulating sheath; the terminal being defined by a metal blade forming part of the circuit and which is carried integrally by the board and projects from a first face of the board. The blade is so formed as to define means for mechanically retaining and electrically connecting the electric wire, and which act on an end portion of the inner conductor.

12 Claims, 3 Drawing Sheets

BOARD-MOUNTED ELECTRONIC DEVICE, IN PARTICULAR AN ELECTRONIC GAS LIGHTER, INCLUDING MEANS FOR FAST CONNECTION OF INSULATED ELECTRIC WIRES TO AN ELECTRIC CIRCUIT ON THE BOARD

TECHNICAL FIELD

The present invention relates to a board-mounted electronic device including means for fast electric connection of insulated electric wires to an electric circuit on the board. Such a device is particularly useful for producing electronic gas-lighting devices for gas cookers.

BACKGROUND ART

In currently used electric/electronic devices, various methods are employed for electrically connecting one or more conducting wires to a circuit printed (or carried) on a board: as shown in EP-A-0177955, U.S. Pat. No. 5,484,456 and EP-A-0727851 the most common consists in soldering the conducting wires to points or seats formed on the printed circuit; another consists in providing the circuit with terminals (normally applied and/or soldered to the board) which are either pressed directly onto the conducting wires, or are designed to receive corresponding male or female connectors fitted beforehand to the wires.

Such connecting systems are obviously slow, complicated, and therefore expensive and difficult to incorporate in automated assembly procedures.

DISCLOSURE OF INVENTION

It is an object of the present invention to provide an electronic device enabling electric connection of one or more insulated wires to an electric circuit on the device without incurring the aforementioned drawbacks, and which at the same time is compact and inexpensive.

According to the present invention, there is provided a board-mounted electronic device, in particular a gas-lighting device for gas cookers, as claimed in claim 1.

The terminals may thus be formed integrally with the circuit and the supporting board, which form a single whole, e.g. by being formed by co-molding the board in synthetic plastic resin with respective tracks of the electric circuit defined by semicut metal strips; and the electric wires to be connected—which may be external wires for connecting the device to the power supply or to a user device, or wires for electrically connecting one or more electronic components on the device to the board-mounted electric circuit—are connected with no soldering or wire terminations required.

BRIEF DESCRIPTION OF DRAWINGS

Two preferred, non-limiting embodiments of the present invention will be described purely by way of example with reference to the accompanying drawings, in which.

BEST MODE FOR CARRYING OUT THE INVENTION

Figure 1:
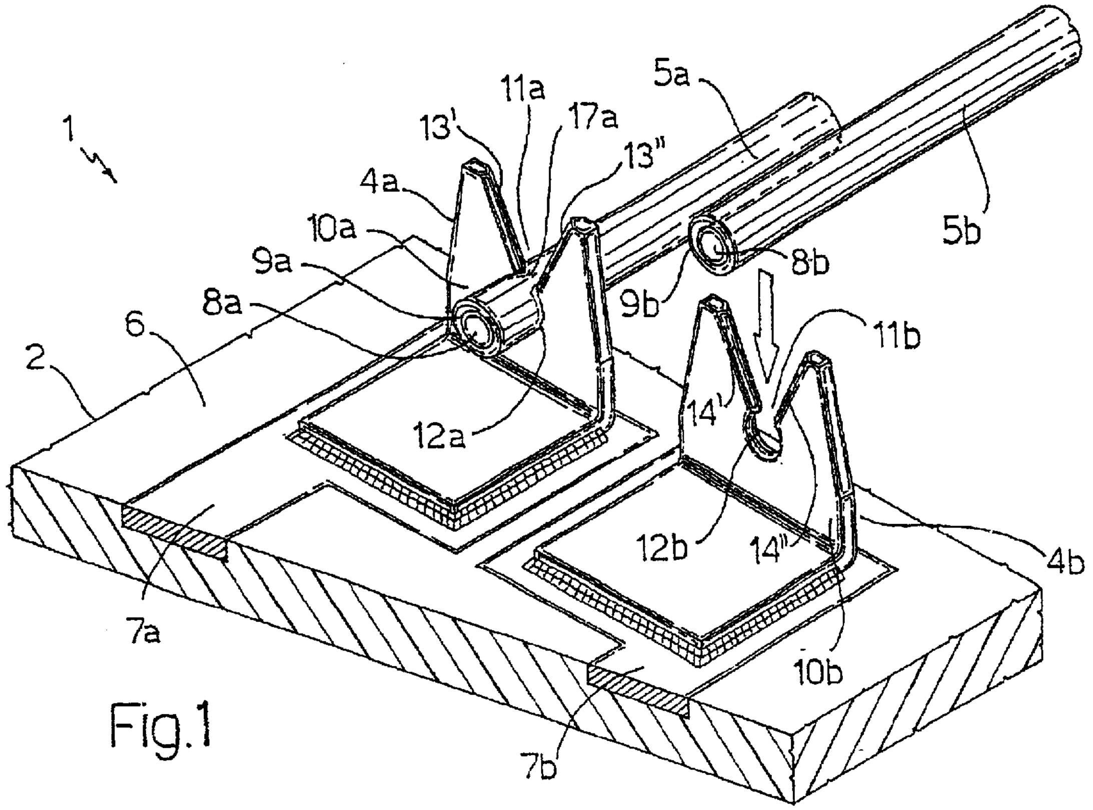
FIG. 1 shows an overall view in perspective of a first embodiment of the device according to the invention.
Figure 2:
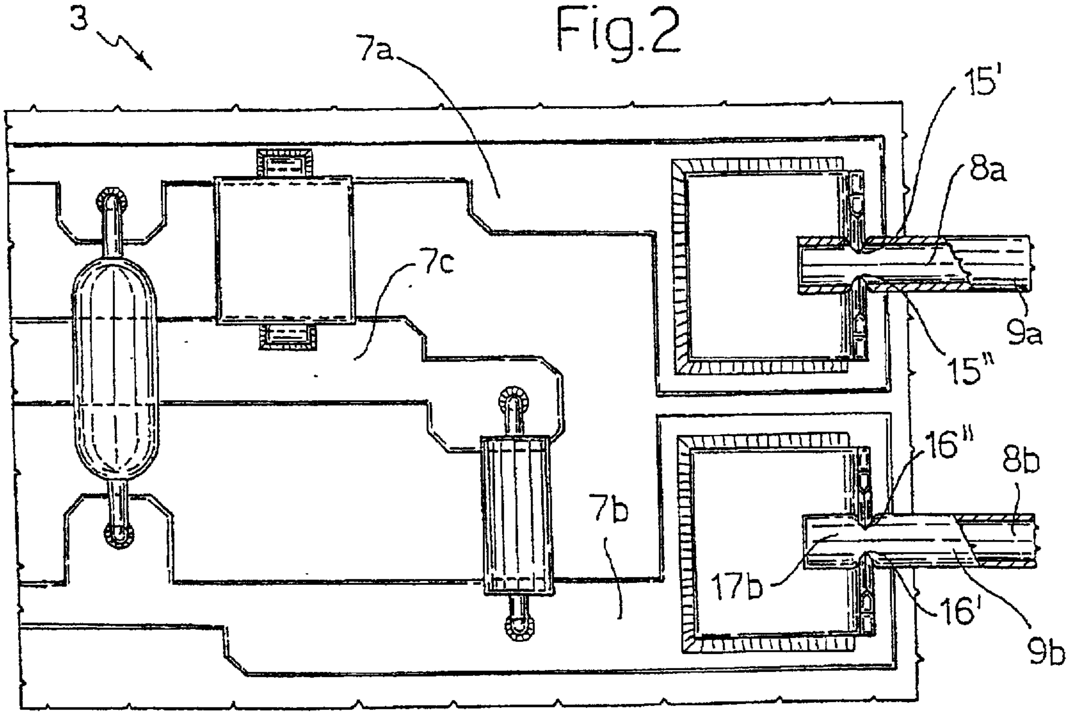
FIG. 2 shows a top plan view of a portion of the FIG. 1 device.

With reference to FIGS. 1 and 2, number 1 indicates as a whole an electronic device in accordance with the teachings of the present invention.

Device 1—in the example, a known gas-lighting device not described in detail (and shown only partly in FIG. 1 for the sake of simplicity)—comprises a supporting board 2; an electric circuit 3 carried by board 2 (only part of board 2 and electric circuit 3 is shown for the sake of simplicity); a pair of connecting terminals 4*a* and 4*b* connected to respective tracks of electric circuit 3; and a corresponding pair of insulated electric wires 5*a* and 5*b*.

Supporting board 2 is molded from synthetic plastic resin and has a face 6 for supporting electronic components.

Electric circuit 3 is known, and comprises a number of tracks (only tracks 7*a*, 7*b*, 7*c* shown partly, for the sake of simplicity) each defined by a semicut metal strip co-molded with supporting board 2.

Insulated electric wires 5*a*, 5*b* comprise respective inner conductors 8*a*, 8*b* of substantially circular cross section and covered with respective insulating sheaths 9*a*, 9*b* coated and/or applied to inner conductors 8*a*, 8*b*.

Each sheath 9*a*, 9*b* therefore has a cross section in the form of an annulus with an inside diameter equal to the diameter of the respective inner conductor.

Terminals 4*a*, 4*b* are defined by respective conducting blades 10*a*, 10*b* forming part of electric circuit 3 and which project from face 6 of board 2 and are carried integrally by board 2.

Conducting blades 10*a*, 10*b* are in the form of integral extensions of respective tracks 7*a*, 7*b* of electric circuit 3, and are each bent into an L outwards of the plane of board 2.

Each blade 10*a*, 10*b* comprises, at a longitudinal end, a respective slot 11*a*, 11*b* in the form of a V-shaped groove for assisting insertion of insulated electric wire 5*a*, 5*b* inside a respective semicircular seat 12*a*, 12*b*, which houses electric wire 5*a*, 5*b*, is of a diameter substantially equal to the diameter of inner conductor 8*a*, 8*b*, and is formed at the vertex of the V-shaped groove defining slot 11*a*, 11*b*.

Slots 11*a* and 11*b* have respective cutting edges 13', 13" (slot 11*a*) and 14', 14" (slot 11*b*) for making respective incisions 15', 15" and 16', 16" on opposite sides of respective sheaths 9*a* and 9*b* when respective electric wires 5*a* and 5*b* are inserted inside respective seats 12*a* and 12*b*.

Since the diameter of seats 12*a* and 12*b* is smaller than the outside diameter of sheaths 9*a* and 9*b* and substantially equal to the diameter of inner conductors 8*a* and 8*b*, incisions 15', 15", 16', 16" are radially through incisions.

Inner conductors 8*a* and 8*b*, at least at one point, therefore contact conducting blades 10*a* and 10*b* to form respective electric connections with electric circuit 3 via the conducting blades.

Moreover, each incision 15', 15", 16', 16" extends circumferentially along an arc of less than 180°, so that the continuity of sheaths 9*a* and 9*b* is maintained along respective portions 17*a* and 17*b*.

In actual use, by means of incisions 15', 15", 16', 16" and integral portions 17*a* and 17*b*, sheaths 9*a* and 9*b* cooperate mechanically with respective edges of seats 12*a* and 12*b* to retain the ends of electric wires 5*a* and 5*b* and so prevent the wires from sliding longitudinally.

Inner conductors 8*a* and 8*b* are therefore connected electrically to electric circuit 3 by contacting blades 10*a* and 10*b* as described above, and the ends of wires 5*a* and 5*b* are secured firmly to respective seats 12*a* and 12*b*.

Figure 3:
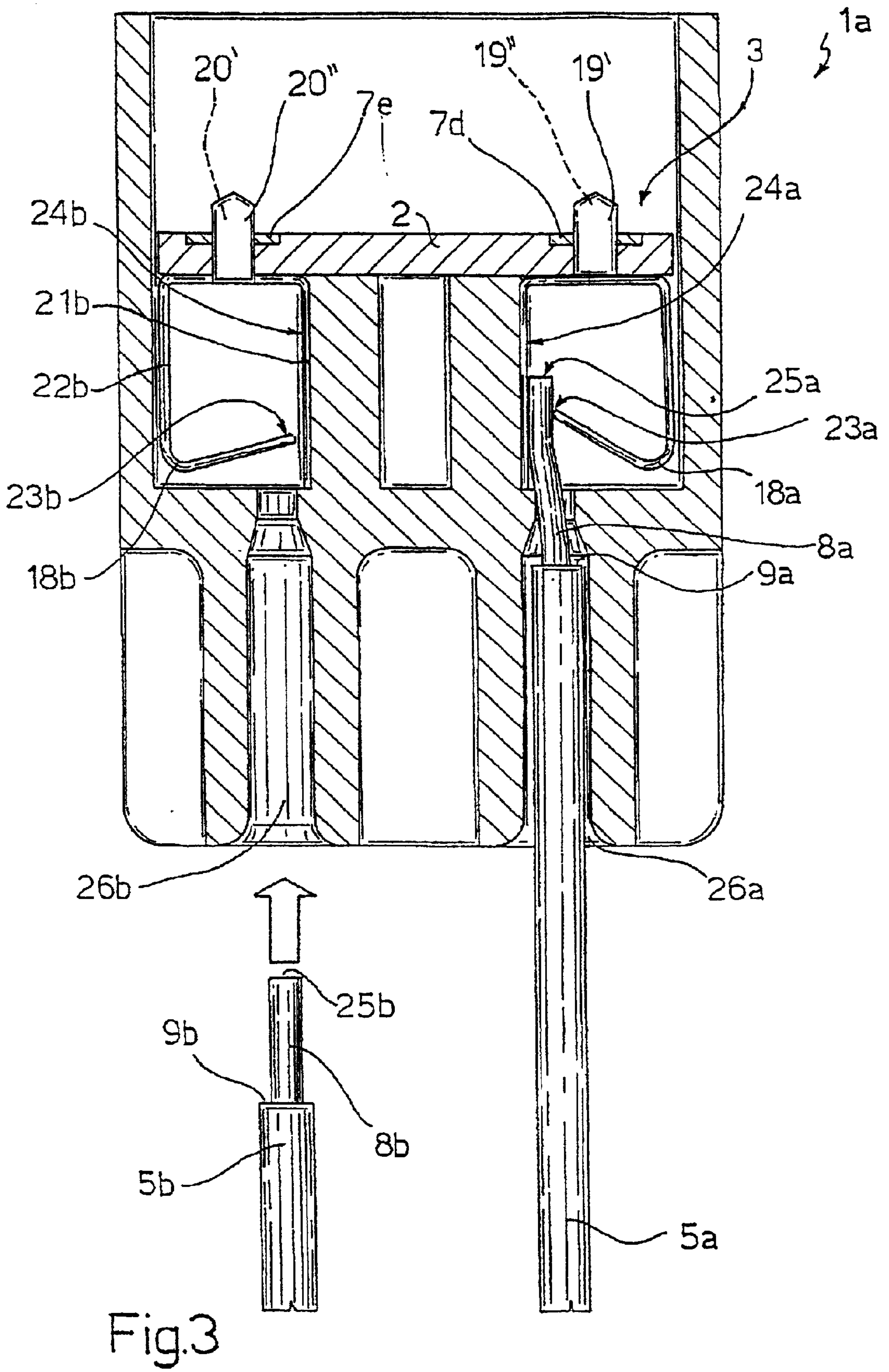
FIG. 3 shows a rear cross section of a second embodiment of the device according to the invention.
Figure 4:
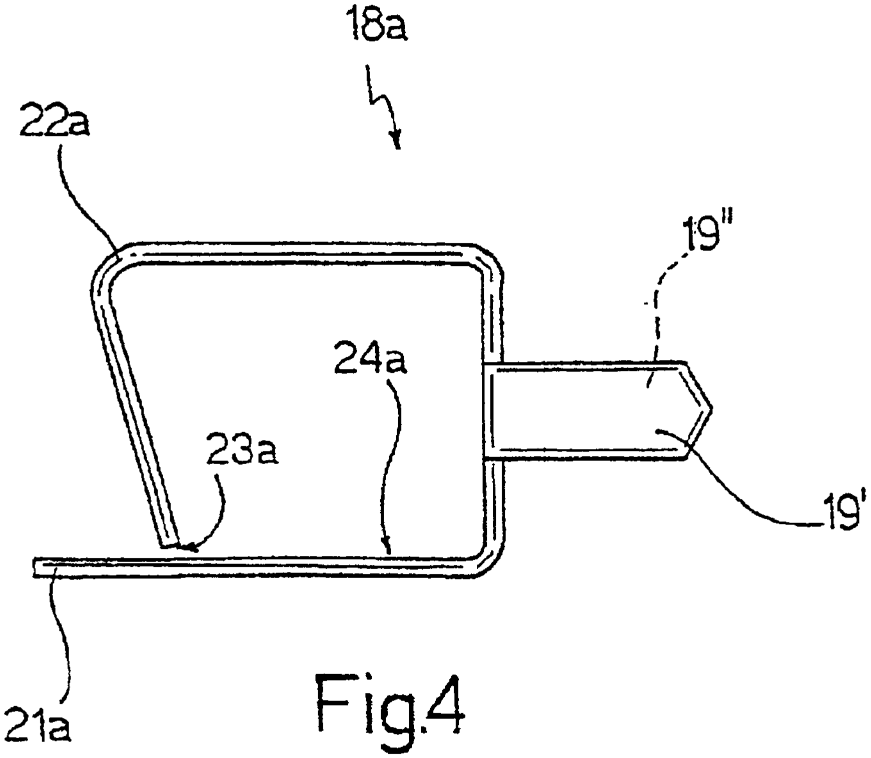
FIGS. 4 and 5 show a rear and side view respectively of a detail of the FIG. 3 device.
Figure 5:
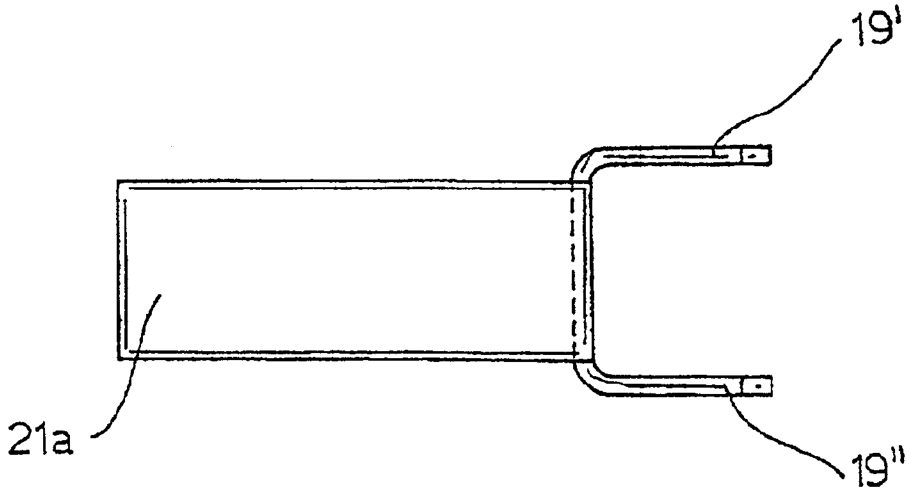

FIGS. 3, 4 and 5 show a variation 1*a* of device 1 as described above, and in which, for the sake of simplicity, any similar or identical details are indicated using the same reference numbers.

The device in the second embodiment comprises supporting board 2; electric circuit 3; a pair of electric wires 5*a*, 5*b*; and a pair of conducting blades 18*a*, 18*b* for connecting electric wires 5*a*, 5*b* electrically and mechanically to electric circuit 3.

Blades 18*a* and 18*b* are fitted integrally to supporting board 2 by means of respective stems 19', 19"(blade 18*a*) and 20', 20" (blade 28*b*), which also provide for establishing contact with respective tracks 7*d* and 7*e* of electric circuit 3.

FIGS. 4 and 5 show blade 18*a*; blade 18*b* is identical and therefore not shown in detail.

Blade 18*a* comprises a first tab 21*a* and a second tab 22*a*, which are, positioned at least partly facing each other.

Tab 22*a* is bent at an acute angle towards tab 21*a*, so that an edge 23*a* of tab 22*a* contacts a surface 24*a* of tab 21*a*.

Tab 22*a* is elastically deformable to permit insertion of wire 5*a* between tabs 21*a* and 22*a*.

Similarly, blade 18*b* comprises a tab 21*b*, a tab 22*b* bent at an cute angle, an edge 23*b*, and a surface 24*b*.

With reference to FIG. 3, insulating sheaths 9*a*and 9*b* are removed from respective ends 25*a* and 25*b* of electric wires 5*a* and 5*b* to enable inner conductor 8*a* to contact tabs 21*a* and 22*a* of blade 18*a*, and inner conductor 8*b* to contact tabs 21*b* and 22*b* of blade 18*b*.

At assembly, electric wires 5*a* and 5*b* are inserted inside respective ducts 26*a* and 26*b*.

By virtue of the rigidity of inner conductors 8*a* and 8*b*, electric wires 5*a* and 5*b* deform respective tabs 22*a* and 22*b*, so that end 25*a* is inserted between edge 23*a* and surface 24*a*, and end 25*b*is inserted between edge 23*b* and surface 24*b*.

Blades 18*a* and 18*b* therefore provide for electrically connecting as well as mechanically retaining electric wires 5*a* and 5*b*.

Clearly, changes may be made to device 1 as described herein without, however, departing from the scope of the present invention.

What is claimed is:

1. A board mounted electronic device, comprising:

a board (2) supporting electronic components and at least one conductive track (7*a*, 7*b*) connected to said electronic components to form an electric circuit (3); and at least one terminal (4*a*, 4*b*) for electrically connecting said circuit (3) and a respective insulated electric wire (5*a*, 5*b*) comprising an inner conductor (8*a*, 8*b*) and an insulating sheath (9*a*, 9*b*) coated and/or applied to the inner conductor (8*a*, 8*b*); wherein said terminal (4*a*, 4*b*) comprises a metal blade (10*a*, 10*b*) which is an integral extension of said track (7*a*, 7*b*) of said circuit (3), bent into an L shape outwards of the plane of the board (2), and carried integrally by the board (2);

said blade (10*a*, 10*b*) defines means (11*a*, 11*b*) for mechanically retaining and electrically connecting said electric wire (5*a*, 5*b*) which act on an end portion of said inner conductor (8*a*, 8*b*);

said blade (10*a*, 10*b*) comprises a respective slot (11*a*, 11*b*) having cutting edges (13', 13", 13', 14") for cutting said insulating sheath (9*a*, 9*b*);

said metal blade and said track are formed on a same face of said board;

the slot (11*a*, 11*b*) comprises a respective semicircular seat (12*a*, 12*b*) of a diameter substantially equal to that of said inner conductor (8*a*, 8*b*) of the electric wire (5*a*, 5*b*) and smaller than the diameter of the insulating sheath (9*a*, 9*b*); and said slot (11*a*, 11*b*) receives one end of said electric wire (5*a*, 5*b*) to cut said insulating sheath (9*a*, 9*b*) to such a depth as to establish contact between said blade (10*a*, 10*b*) and said inner conductor (8*a*, 8*b*) of the electric wire (5*a*, 5*b*), while at the same time forming a joint to mechanically retain the electric wire (5*a*, 5*b*) inside said seat (12*a*, 12*b*).

2. A device as claimed in claim 1, wherein said slot (11*a*, 11*b*) is substantially in the form of a V shaped groove for assisting insertion of said end of said electric wire (5*a*, 5*b*) inside said seat (12*a*, 12*b*), which is formed at the vertex of the V defining said groove.

3. A device as claimed in claim 2, wherein said circuit (3) comprises a number of said tracks (7*a*, 7*b*), each defined by a semicut metal strip applied to said board (2).

4. A device as claimed in claim 3, wherein said board (2) is molded from synthetic plastic resin and said strip is co-molded with the board (2).

5. A board mounted electronic device, comprising:

electronic components;

a board supporting said electronic components and having at least one conductive track connected to said electronic components to form an electric circuit; and at least one terminal for electrically connecting said circuit with an insulated electric wire comprising an inner conductor and an outer insulating sheath;

wherein said terminal comprises a metal blade for mechanically retaining and electrically connecting said electric wire with said circuit, said metal blade being an integral extension of said track of said circuit, being bent into an L shape outwards of the plane of the board, and being carried integrally by the board;

said metal blade and said track are formed on a same face of said board;

said blade has a V-shaped slot that comprises two straight cutting edges for cutting said insulating sheath, said cutting edges being slanted with respect to each other, converging toward the vertex of the V defining said groove, and ending at a seat formed at said vertex; and said seat describes a circular curve extending for more than 180°, connecting adjacent ends of said cutting edges, and having a diameter substantially equal to that of said inner conductor of the electric wire and smaller than the diameter of the insulating sheath.

6. The device of claim 5, wherein a distance between said adjacent ends of said cutting edges is smaller than the diameter of the circular curve.

7. In combination, a board mounted electronic device and an insulated electric wire;

said insulated electric wire comprising an inner conductor and an outer insulating sheath;

said board mounted electronic device comprising:

electronic components;

a board supporting said electronic components and having at least one conductive track connected to said electronic components to form an electric circuit; and at least one terminal electrically connecting said circuit with said insulated electric wire; wherein said terminal comprises a metal blade mechanically retaining and electrically connecting said electric wire with said circuit, said metal blade being an integral extension of said track of said circuit, being bent into an L shape outwards of the plane of the board, and being carried integrally by the board;

said blade has a V-shaped slot that comprises two straight cutting edges for cutting said insulating sheath, said cutting edges being slanted with respect to each other, converging toward the vertex of the V defining said groove, and ending at a seat formed at said vertex;

said metal blade and said track are formed on a same face of said board;

said seat describes a circular curve extending for more than 180°, connecting adjacent ends of said cutting edges, and having a diameter substantially equal to that of said inner conductor of the electric wire and smaller than the diameter of the insulating sheath; and said seat receives one end of said electric wire with said insulating sheath being cut by said cutting edges to such a depth as to establish contact between said blade and said inner conductor of the electric wire, while at the same time forming a joint to mechanically retain the electric wire inside said seat.

8. The combination of claim 7, wherein a distance between said adjacent ends of said cutting edges is smaller than the diameter of the circular curve.

9. The combination of claim 7, wherein a distance between said adjacent ends of said cutting edges is smaller than the diameter of the inner conductor.

10. The combination of claim 7, wherein said inner conductor is partially cut by said cutting edges at said end of said insulated wire.

11. The device as claimed in claim 5, wherein said track is defined by a metal strip co-molded with the board.

12. The combination as claimed in claim 7, wherein said track is defined by a metal strip co-molded with the board.

* * * * *

UNITED STATES PATENT AND TRADEMARK OFFICE

CERTIFICATE OF CORRECTION

PATENT NO. : 6,741,453 B1
DATED : July 22, 2004
INVENTOR(S) : Aleardi, Massimo et al.

It is certified that error appears in the above-identified patent and that said Letters Patent is hereby corrected as shown below:

Title page,
Item [30], Foreign Application Priority Data, should read -- TO98U000144 --

Signed and Sealed this

Sixteenth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,741,453 B1 Page 1 of 1
DATED : May 25, 2004
INVENTOR(S) : Aleardi, Massimo et al.

It is certified that error appears in the above-identified patent and that said Letters Patent is hereby corrected as shown below:

Title page,
Item [30], Foreign Application Priority Data, should read -- TO98U000144 --.

This certificate supersedes Certificate of Correction issued November 16, 2004.

Signed and Sealed this

Fourteenth Day of February, 2006

JON W. DUDAS
*Director of the United States Patent and Trademark Office*